United States Patent [19]

Gaewsky

[11] Patent Number: 4,887,118
[45] Date of Patent: Dec. 12, 1989

[54] ELECTRONIC FLASH CAMERA HAVING REDUCED CYCLE TIME

[75] Inventor: John P. Gaewsky, Reading, Mass.

[73] Assignee: Polaroid Corporation, Cambridge, Mass.

[21] Appl. No.: 289,780

[22] Filed: Dec. 27, 1988

[51] Int. Cl.⁴ .................. G03B 15/05; G03B 17/52
[52] U.S. Cl. .................. 354/413; 354/145.1; 354/173.1; 354/484; 354/83
[58] Field of Search .......... 354/412, 413, 418, 127.1, 354/127.11, 127.12, 145.1, 173.1, 173.11, 83

[56] References Cited

U.S. PATENT DOCUMENTS

| | | | |
|---|---|---|---|
| 3,415,644 | 12/1968 | Land | 96/3 |
| 3,753,392 | 8/1973 | Land | 95/13 |
| 3,846,812 | 11/1974 | Biber | 354/145 |
| 3,942,183 | 3/1976 | Whiteside | 354/29 |
| 4,074,295 | 2/1978 | Kee | 354/145 |
| 4,199,244 | 4/1980 | Shenk | 354/195 |
| 4,199,246 | 4/1980 | Muggli | 354/195 |
| 4,231,645 | 11/1980 | Davis et al. | 354/145 |
| 4,472,041 | 9/1984 | Carcia et al. | 354/413 |

Primary Examiner—W. B. Perkey
Attorney, Agent, or Firm—John J. Kelleher

[57] ABSTRACT

A self-developing camera system having an electronic flash, a film transport and processing system including a motor, and a battery for supplying electrical power to the electronic flash and to the motor. The camera system further includes a control system that connects the battery to the electronic flash for charging purposes and to the motor simultaneously during processing of an exposed film unit as long as the battery voltage does not go below a level that would interfere with the motor's ability to properly drive the film transport system, thus reducing the overall camera cycle time.

9 Claims, 3 Drawing Sheets

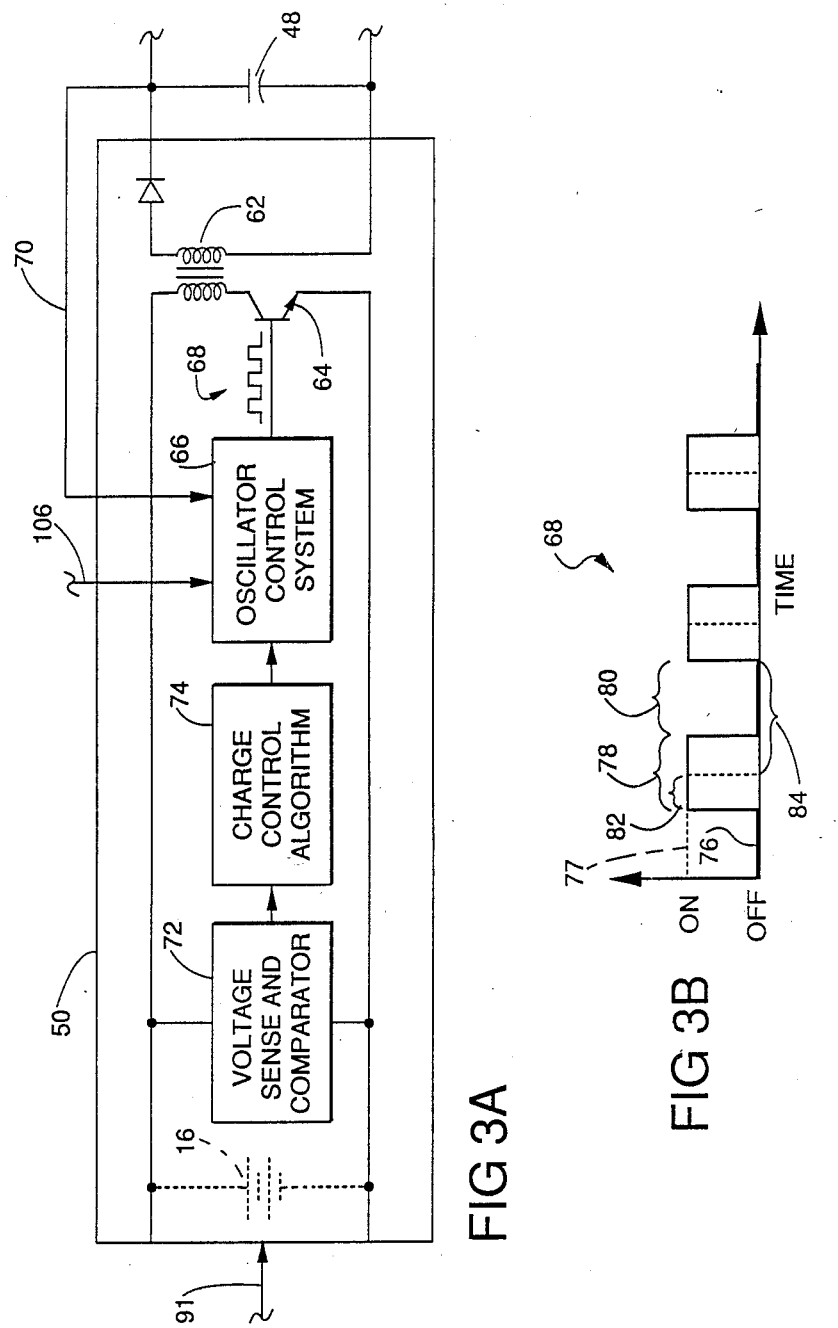

ELECTRONIC FLASH CAMERA HAVING REDUCED CYCLE TIME

BACKGROUND OF THE INVENTION

1. Field of the Invention

The present invention relates to a photographic camera of the self-developing type having an electronic flash, in general, and to such a camera having means for reducing the overall cycle time of such a camera, in particular.

2. Description of the Prior Art

Automatic photographic cameras of the self-developing type such as those sold by Polaroid Corporation of Cambridge, Mass., under its registered trademark "Impulse" are well known in the art. These cameras are intended to be used with film cassettes containing a plurality of self-developing film units together with a battery which supplies electrical energy for the operation of certain camera systems whose functions, in part, are to expose and process a film unit. These cameras may, for example, include an exposure control system, a motor powered film transport system for transporting and processing an exposed film unit and electronic logic circuits that provide a sequence control of such camera systems. In addition, these cameras are adapted for use with an electronic flash that is powered from the same film cassette battery in a manner similar to that described in U.S. Pat. No. 4,074,295 to R. C. Kee or in U.S. Pat. No. 4,231,645 to C. W. Davis, et al, both in common assignment herewith.

Heretofore, the simultaneous charging of an electronic flash in a self-developing camera and the operation of an electrical subsystem that causes a heavy power drain of the camera's battery, such as the operation of the motor that powers the film unit transport system mentioned above, was avoided. Such simultaneous charging and motor operation would consume large amounts of power and thereby may reduce the battery's output voltage below a level where it could properly drive the motor for film processing purposes, if the power consumption continued for an extended period of time. Therefore, the operation of the film transport and processing motor and the charging of the electronic flash was sequentially timed so as not to occur simultaneously. This sequential type of electronic flash charging and motor control is fully described in U.S. Pat. No. 3,846,812 to C. H. Biber, in common assignment herewith. In the camera described in this just-mentioned patent, once an exposed film unit has been transported for processing and ejected from the camera, the electronic flash is sequenced to charge in readiness for the next succeeding photographic exposure operation. During the time that the motor is being operated for film transportation and processing, charging of the electronic flash is inhibited. In the above-noted "Impulse" camera, for example, electronic flash charging is inhibited for almost two seconds, which is approximately one-half the total time required to fully charge the electronic flash. The length of time that the charging of the electronic flash is inhibited is an additional length of time that a camera operator must wait before initiating the next camera cycle, a length of time that may interfere with the camera operator's ability to rapidly photograph the next scene.

SUMMARY OF THE INVENTION

It is a primary object of the present invention, therefore, to reduce the overall exposure cycle time of a photographic camera system of the self-developing type that includes an electronic flash.

It is a further object of the present invention to reduce the overall exposure cycle time of a photographic camera system of the self-developing type having an electronic flash that is connected to a common power source for electronic flash charging purposes, without adversely affecting the operation of other power consuming camera devices that are also simultaneously connected to the same common power source.

It is another object of the present invention to reduce the overall exposure cycle time of a photographic camera system of the self-developing type having an electronic flash, by charging the electronic flash at the same time that the camera's film unit transport system is properly transporting an exposed film unit during film processing.

Other objects, features and/or advantages of the present invention will be readily apparent from the following detailed description of a preferred embodiment thereof when taken in conjunction with the accompanying drawings.

In accordance with a preferred embodiment of the present invention, a photographic camera system of the type that includes an electronic flash, a battery for supplying electrical power to the camera and a motor driven transport system that transports an exposed film unit during film processing is provided with control means for simultaneously connecting the electronic flash to the battery for electronic flash charging purposes while the film unit transport motor properly transports an exposed film unit for film processing in order to reduce the overall exposure cycle time. The control means maintains the electrical connection between the battery and the electronic flash while the motor driven transport system transports an exposed film unit so long as the voltage of the battery is equal to or greater than a magnitude that does not interfere with the transport motor's ability to acceptably drive the system so as to transport an exposed film unit during film processing to thereby reduce the overall exposure time of the camera system. The overall exposure cycle time starts with the actuation of an exposure initiating button and ends when the electronic flash has been recharged to a level whereat a subsequent exposure using the electronic flash may be made.

BRIEF DESCRIPTION OF THE DRAWINGS

FIG. 3A is a functional block diagram and schematic of the voltage converter and control portion of the functional block diagram of drawing FIG. 2.

FIG. 3B is an enlarged amplitude vs. time graph of the electronic flash, charge-controlling square wave signal shown in drawing FIG. 3A.

DESCRIPTION OF A PREFERRED EMBODIMENT

Figure 1:
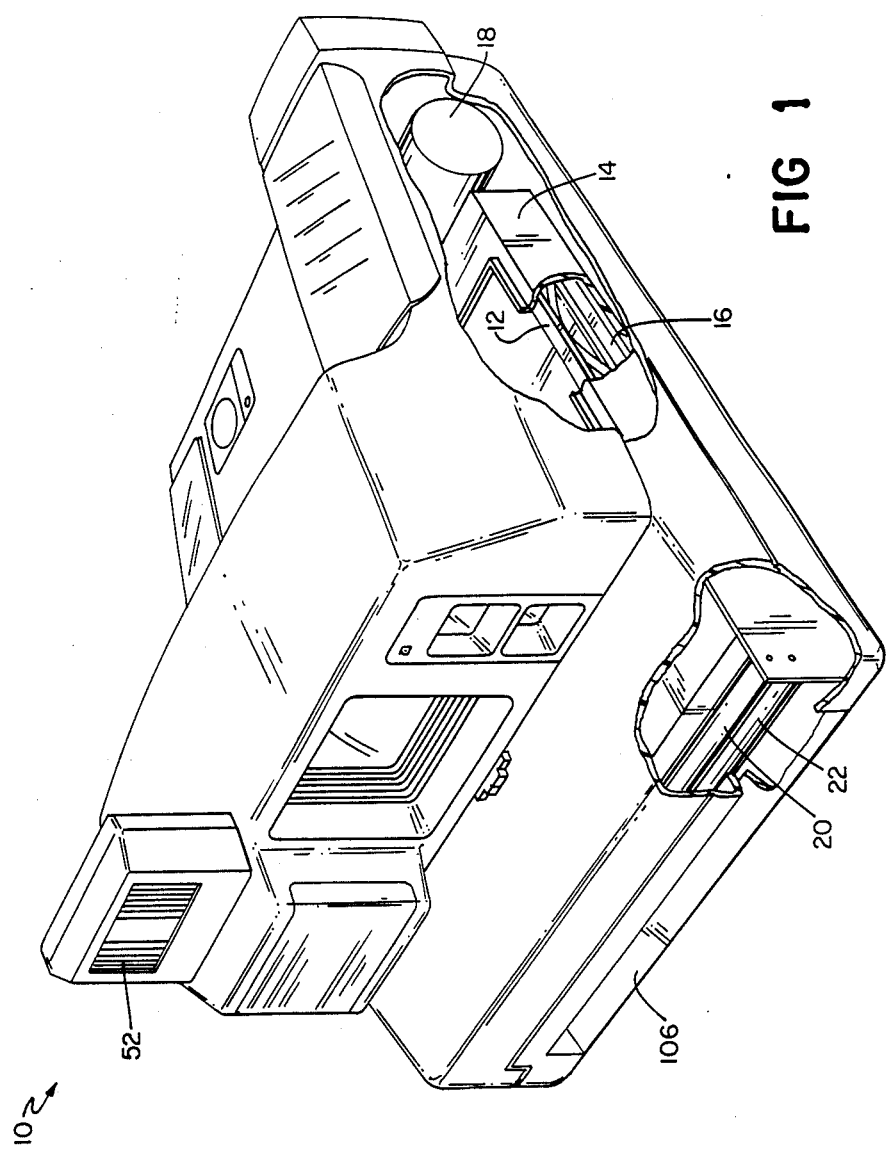
FIG. 1 is a perspective view, partly in section, of a self-developing electronic flash camera that incorporates a preferred embodiment of the exposure cycle time reducing arrangement of the present invention.

Referring now to the drawings, and specifically to FIG. 1, there is shown an electronic flash camera 10, of the self-developing type, incorporating a preferred embodiment of the exposure cycle time reducing arrangement of the present invention. The camera 10 is designed for use with a self-developing film unit 12 similar to those described in U.S. Pat. No. 3,415,644 to Land, in common assignment herewith, and specifically incorporated herein by reference. The film unit 12 is packaged in a film cassette 14 shown in the condition assumed just after the cassette 14 has been inserted into the camera 10. The cassette 14 further encloses a 6 VDC battery 16. The battery 16 supplies electrical energy for the operation of several electrically operated camera subsystems and components.

Mounted within the camera 10 is a film advancing apparatus 15 (FIG. 2) similar to that described in U.S. Pat. No. 3,753,392 to Land that includes a motor 18 for operating a gear train (not shown) which is coupled with the film advancing apparatus 15 to provide for the continuous movement of an exposed film unit from an exposure position within the camera 10 toward the exterior thereof. The film advancing apparatus 15 additionally includes a film-engaging arm member (not shown) driven by the motor 18 and the above-mentioned gear train. The arm member is adapted to extend into a slot in the cassette 14, as shown in the above-noted Land '392 patent, and engage the uppermost film unit 12 at or near its trailing edge prior to moving it out of the cassette 14 and into the bite of a pair of processing rollers 20 and 22 mounted adjacent a leading edge of the film unit 12. The rotating processing rollers 20 and 22, which are driven by the motor 18 through the above-mentioned gear train, continue the uninterrupted movement of the film unit toward the exterior of the camera 10 while simultaneously rupturing a container of processing liquid at the leading end of an exposed film unit. The processing rollers 20 and 22 spread the liquid contents of the ruptured container between photosensitive and image receiving elements of the film unit to initiate formation of a visible image within the film unit in a manner that is well-known in the art.

Figure 2:
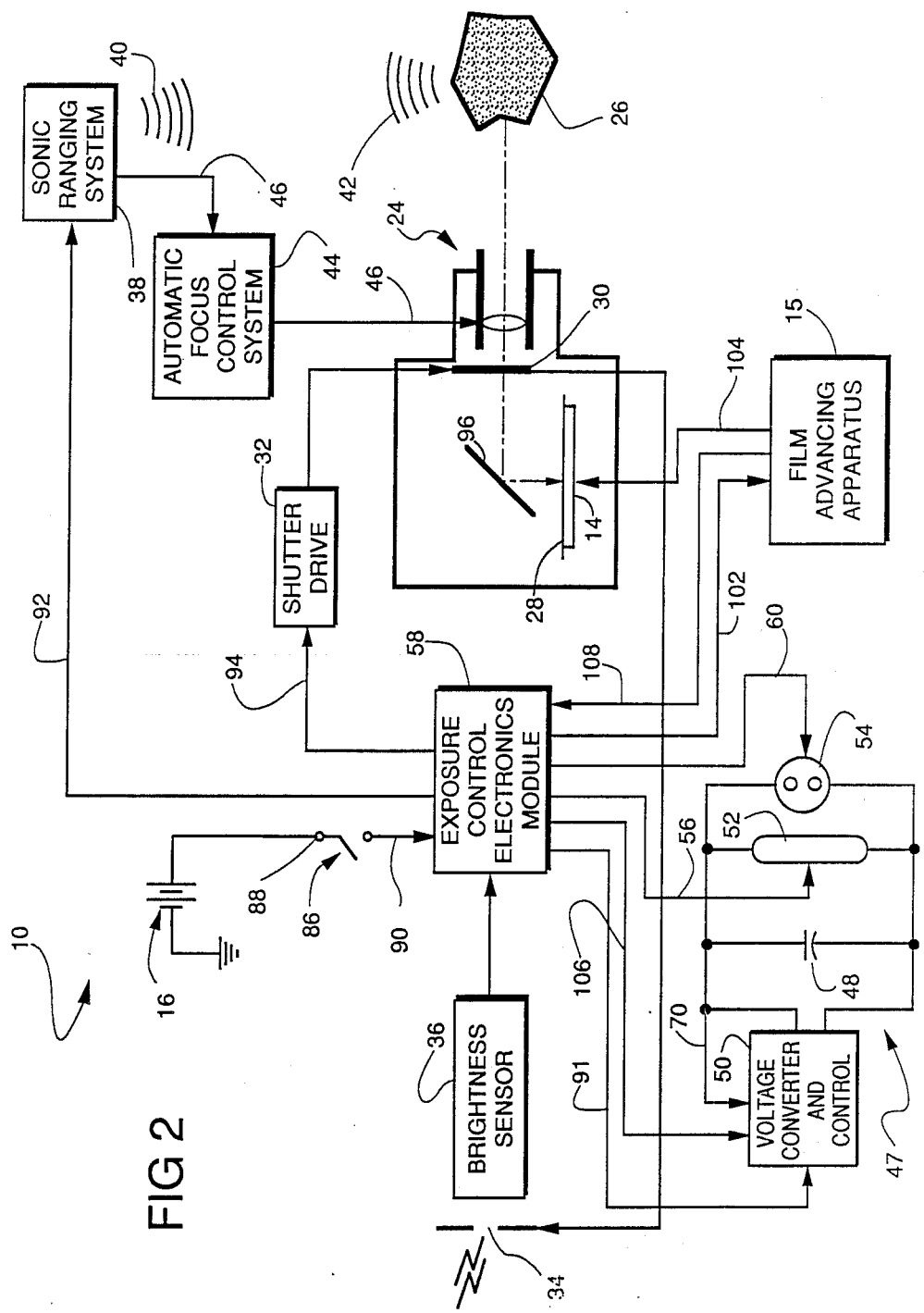
FIG. 2 is a functional block diagram of the exposure control, lens-focusing and film advancing systems of the camera of drawing FIG. 1.

With additional reference to FIG. 2 of the drawings, the camera 10 also includes an objective or taking lens 24 comprising a plurality of elements retained in a spaced relation by a conventional cylindrical lens mount which may be adapted in a well-known manner to provide translational movement of the elements of the lens 24 along a central optical axis for focusing image-carrying light rays of, for example, an object 26 on a film plane 28 of the camera 10 through an aperture formed in a shutter mechanism 30.

The shutter mechanism 30, positioned intermediate of the lens 24 and the film plane 28, includes a pair of overlapping shutter blade elements (not shown in detail) of the "scanning" type. Scene light admitting primary apertures (not shown) are provided in each of the shutter blade elements to cooperatively define a progressive variation of effective aperture openings in accordance with simultaneous longitudinal and lateral displacement of one blade element with respect to the other blade element in a manner more fully described in commonly assigned U.S. Pat. No. 3,942,183 to Whiteside, now specifically incorporated herein by reference. The blade element apertures are selectively shaped so as to overlap the central optical axis of the lens 24 thereby defining a gradually varying effective aperture size as a function of the position of the blade elements of the shutter assembly 30. A shutter drive 32 is provided for displacing the shutter blade elements of the shutter mechanism 30. The shutter drive 32 includes a tractive electromagnetic device in the form of a solenoid (not shown) employed to displace the shutter blade elements with respect to one another in a manner more fully described in the above-noted Whiteside patent.

Each of the shutter blade elements additionally includes a secondary aperture (not shown in detail) with an aperture in one blade element cooperating with an aperture in another blade element to form an opening 34 therethrough. These secondary apertures may be configured to track in a predetermined corresponding relationship with the scene light admitting primary apertures (not shown) within the shutter mechanism 30. With the primary and secondary apertures being formed in the same blade element and therefore being mechanically coupled to one another, it is readily apparent that the secondary apertures move in the same manner as the primary apertures. The secondary apertures move in the same direction as the primary apertures when controlling scene light passing through the secondary-aperture-formed opening 34, transmitted from a scene being photographed, to a photosensitive element (not shown) within a brightness sensor 36. An example of scanning blade elements having primary and secondary apertures that cooperate to control the amount of scene light admitted to a single photosensitive element is shown in U.S. Pat. No. 3,942,183, supra.

The photographic camera 10 is provided with a sonic ranging system 38 that includes a ranging circuit and an ultrasonic transducer (neither shown) which may be actuated to transmit a burst of sonic energy 40 toward a subject to be photographed, such as the subject 26. The transducer thereafter operates to detect an echo 42 of the burst of sonic energy reflected from the subject 26. The total round-trip time for a burst of sonic energy to be transmitted toward and for an echo thereof to be reflected from the subject 26 and detected by the transducer of the sonic ranging system 38 is a fairly accurate measure of camera-to-subject distance. An electrical signal representative of this round-trip time is subsequently employed to focus the adjustable focus lens 24. U.S. Pat. No. 4,199,246 to Muggli describes such a sonic rangefinder in much greater detail. An automatic focus control system 44, coupled to the adjustable focus lens 24 through a path 45, causes the lens 24 to focus an image of the subject 26 onto the film plane 28 of the camera 10 during an exposure, in response to an electrical subject distance related signal from the sonic ranging system 38 through a path 46. An example of an automatic focus control system functioning in this manner is more fully described in U.S. Pat. No. 4,199,244 to Shenk.

The camera 10 is also provided with an electronic flash apparatus 47 together with apparatus for controlling its energization, to provide a portion of the exposure value required to illuminate a scene to be photographed. The electronic flash apparatus 47 comprises a main storage capacitor 48 which may be charged up to an operating voltage by a voltage converter and control 50. The design and operating characteristics of the voltage converter and control 50 will be described below in detail. In general, voltage converter and control 50 operates to convert a dc voltage as may be derived from the 6 VDC battery 16 contained within the cassette 14, to a suitable operating voltage such as 350 VDC. A flash tube 52 and a quench tube 54 are connected in a parallel relation with respect to the main storage capacitor 48. The flash tube 52 may be energized by a suitable trigger signal on a path 56 from a conventional trigger circuit (not shown) within an exposure control electronics module 58, and the quench tube 54 may be ignited by a suitable trigger signal on a path 60 from another conventional trigger circuit (not shown) that is also included within the exposure control electronics module 58.

As noted above, the camera 10 includes the film advancing apparatus 15 for the continuous movement of an exposed film unit from an exposure position within the camera 10 toward the exterior thereof. The rollers 20 and 22 driven by the motor 18 of the film advancing apparatus 15 rupture a container of processing liquid at the leading end of an exposed film unit and then spread its contents between photosensitive and image receiving film elements on layers thereof to initiate the formation of a visible image. In order to produce an image having the desired resolution and sensitometric characteristics, it is essential that the layer of processing liquid that is spread between the film elements by the spread rollers 20 and 22 be of a uniform and predetermined thickness. This type of processing liquid layer thickness is produced, in part, by driving the rollers 20 and 22 at a fairly constant and predetermined rate of speed. A roller speed in excess of this predetermined rate will cause the spreading of an excessively thick layer of processing liquid between the film elements, whereas a roller spread below this predetermined rate will cause the spreading of an excessively thin layer of processing liquid between the film elements.

Inasmuch as the rollers 20 and 22 are driven by the motor 18, maintaining the rotational speed of the motor 18 within certain limits will result in the proper rotational speed of the rollers 20 and 22 and therefore the proper spreading of a layer of processing liquid between the film elements. The rotational speed of the motor 18 can readily be maintained within the desired limits if the voltage level of the power source supplying electrical energy to the motor 18, such as the 6 VDC battery 16 within the cassette 14, is maintained within certain voltage limits. However, if a large current drain producing load is connected to a common power source such as the battery 16 at the same time that the battery 16 is supplying electrical power to the film advancing apparatus 15, such as the charging circuitry within the electronic flash apparatus 47, the converter and control 50 that charges the main storage capacitor 48 will place a substantial current drain on the battery 16. This level of power consumption will ultimately reduce the level of voltage available from the battery 16. With the film advancing apparatus being operated at the same time that the electronic flash apparatus 47 is being charged, the voltage available from the common power source or battery 16 will ultimately drop below the minimum level required to maintain the motor 18 and therefore the rollers 20 and 22 coupled thereto at a rotational speed necessary to produce a photographic image having the desired resolution and sensitometric characteristics mentioned above.

In the past this problem was avoided by inhibiting the operation of the charging cicuitry within the electronic flash apparatus until movement of an exposed film unit by the film advancing apparatus for film processing and for movement out of a self-developing camera was complete. The amount of inhibit time as a function of the total electronic flash charging time in a self-developing camera was considerable. For example, it takes approximately 4 seconds to charge the electronic flash aparatus in one type of self-developing camera when the main storage capacitor in the electronic flash apparatus is fully discharged. The film advancing apparatus takes approximately 2 seconds to move an exposed film unit from its exposure position to the exterior of the camera. Charging of the electronic flash apparatus was delayed for this entire 2 second interval which amounts to 50 percent of the total charging time required to fully charge the electronic flash. As a consequence, the exposure cycle time, which is defined herein as the length of time required between the actuation of a camera's shutter button by a camera operator to initiate an exposure cycle and the time that the electronic flash is fully charged and is ready for the next exposure, is lengthened by this 2 second interval of time. A camera operator may, for example, miss an opportunity to photograph a particular scene if the subject matter of the scene is only available during this 2 second time interval. The present arrangement avoids this problem by sensing the battery voltage and then enabling the charging of the elecronic flash during the operation of the film advancing apparatus 15, in a particular manner, only when the battery voltage does not drop below a minimum voltage level where it would interfere with its ability to maintain the proper rotational speed of the film advancing apparatus drive motor 18. A circuit for controlling the charging of the electronic flash apparatus 47 as a function of the voltage provided to the camera 10 by the battery 16 when its output voltage is equal to or exceeds the above-mentioned minimum voltage level is shown in drawing FIG. 3A.

In FIG. 3A, there is shown a schematic diagram of the voltage converter and control 50 of the camera 10. The voltage converter and control 50 includes a voltage step-up transformer 62 whose primary coil is in series with switch means that includes a transistor 64, and the battery 16. An oscillator control system 66 is also included within the voltage converter and control 50. When energized, oscillator control system 66 generates a square wave output signal 68 at a frequency of approximately 20 kilohertz. This output signal is applied to the base of the transistor 64 which, in turn, causes the power from the battery 16 to be applied to the primary of the voltage step-up transformer 62 at this 20 kilohertz frequency. This varying power that is applied to the primary of the transformer 62 is converted from a level of approximately 6 VDC to a working level of approximately 350 VDC. The converted power at this 350 VDC voltage level is then employed to charge the electrical energy storing main storage capacitor 48 which is connected to a secondary coil of the transformer 62 through a voltage rectifying diode. Circuitry (not shown) within the oscillator control 66 senses the voltage level on the main storage capacitor 48 through a path 70. When the voltage on the capacitor 48 reaches a predetermined magnitude, the above-noted circuitry terminates the square wave output of the oscillator control system 66 and therefore the charging of the main storage capacitor 48.

Voltage sense and comparator 72 senses the output voltage of the battery 16 and then utilizes a comparator (not shown) to determine whether or not the sensed voltage is equal to or greater than a predetermined magnitude. This predetermined magnitude is the minimum voltage that will properly operate the drive motor 18 to transport an exposed film unit during film processing. The output of the voltage sense and comparator 72 is applied to a charge control algorithm 74 which controls the rate at which the oscillator control system 66 causes the main storage capacitor 48 to be charged. The charging rate of the main storage capacitor 48 is controlled by maintaining the square wave output signal 68 at a fixed 20 kilohertz frequency and varying the width of each portion of the square wave that turns on the transistor 64. An enlarged representation of a portion of the square wave signal 68 generated by the oscillator control system 66 is shown in drawing FIG. 3B.

With additional reference to FIG. 3B, square wave signal 68 having a frequency of 20 kilohertz regularly varies in magnitude from a minimum voltage level 76 wherein the transistor 64 is in its off or non-conducting state, to a maximum voltage level 77 where the transistor 64 is placed in its on or conducting state. In this particular transistor 64 switching arrangement and under conditions where the output voltage of the battery 16 is at or near its maximum output level, the length of time 78 that the square wave signal 68 is at its maximum level 77 is approximately equal to the length of time 80 that this signal is at its mimimum level 76. As a consequence, under such conditions the on and off times of the transistor 64 are approximately equal. As the difference between the output voltage of the battery 16 and the minimum voltage required to properly operate the drive motor 18 during film processing decreases, as determined by the voltage sense and comparator 72, the charge control algorithm 74 causes the pulse width or on time 78 and the off time 80 of the square wave signal 68 to decrease and increase, respectively, in response to this decreasing voltage difference. As an example, and as shown in FIG. 3B, the pulse width on time of the square wave signal 68 may be reduced to the time interval 82 at a particular level of the battery 16 voltage, whereas the off time, which constitutes the remainder of a square wave cycle, would concurrently be increased to the time interval 84. When the output voltage of the battery 16 is less than the minimum voltage required to properly operate the drive motor 18 during film processing, the on time of the square wave signal 68 would be zero and, therefore, as will be explained below, no further charging of the electronic flash apparatus 47 would be allowed to occur during this low voltage condition while the motor 18 is driving the film advancing apparatus 15 during film transport and processing.

OPERATION

A typical exposure cycle that includes the simultaneous charging of the electronic flash apparatus 47 and the operation of the drive motor 18 during film processing will now be described in detail. For the purpose of this description, it is assumed that the output voltage of the battery 16 is at or near its maximum level and that the flash apparatus 47 is fully charged. With reference to FIGS. 1 and 2 of the drawings, a switch 86 is actuated to its closed position by a camera operator to initiate an exposure cycle. The closure of the switch 86 couples the battery 16, which is connected to a terminal 88, to the exposure control electronics module 58 through a path 90 and then to the voltage converter and control 50 through the exposure control electronics module 58 and the path 91. The exposure control electronics module 58, in turn, actuates the sonar ranging system 38 through a path 92 to derive a subject 26 to camera 10 distance signal which is then employed by the focus control system 44 to adjust the lens 24 to the correct focus position. The exposure control electronics module 58 also actuates the shutter drive 32 through a path 94 to thereby drive the shutter mechanism 30 to generate an exposure interval in a conventional manner so that an image of the subject 26 may be reflected by a mirror 96 and formed on the film plane 28 of the camera 10 by the lens 24 in conformance with the level of scene light as determined by the brightness sensor 36.

During the exposure interval, the flashtube 52 and the quenchtube 54 are ignited by the exposure control electronics module 58 to produce the required amount of supplemental scene illumination in the above-described manner, also in conformance with the level of scene light that is sensed by the brightness sensor 36. At the completion of the exposure interval, the exposure control electronics module 58 actuates the film advancing apparatus 15 and the drive motor 18 included therein, through a path 102, to initiate the transport and film processing of an exposed film unit. The film advancing apparatus 15, in turn, moves the exposed film unit, located in the cassette 14, through the path 104, into the bite of the rollers 20 and 22, and then drives the rollers, in the manner described above, to spread processing liquid between certain film unit layers and to move the exposed film unit into an exit slot 106 (FIG. 1) in the housing of the self-developing camera 10.

At the same time that the film advancing apparatus 15 is actuated to initiate the transport and processing of an exposed film unit, the oscillator control system 66 within the voltage converter and control 50 is actuated to initiate the charging of the main storage capacitor 48 of the electronic flash apparatus 47 through a path 106. The simultaneous operation of the drive motor 18 within the film advancing apparatus 15 and the charging of the electronic flash apparatus 47 will continue, in the above-described manner, until the main storage capacitor 48 is fully charged, only as long as the output voltage of the battery 16 does not drop below a level that would interfere with the ability of the drive motor 18 to properly drive the film advancing apparatus 15 during film transport and processing.

As noted above, voltage sense and comparator 72 determines when this low level of voltage occurs and then causes the charge control algorithm 74 to terminate the charging of the main storage capacitor 48 by the oscillator control system 66 for as long as this condition persists. The voltage on the main storage capacitor 48, which is a direct measure of its charge level, is monitored by the oscillator control system 66 through the path 70, as previously noted. If the main storage capacitor 48 is not fully charged before its charging has been terminated due to an excessively low level of battery 16 output voltage, capacitor 48 charging will continue until it is fully charged after operation of the film advancing apparatus 15 is complete. Completion of the film advancing apparatus 15 cycle is monitored by the exposure control electronics module through a path 108. When the film advancing apparatus 15 cycle is complete, the exposure control electronics module 58 once again initiates charging of the main storage capacitor 48 by the oscillator control system 66 with a charge initiation signal through the path 106 which temporarily overrides the control of the oscillator control system 66 by the charge control algorithm 74 until the capacitor 48, as sensed through the path 70, is fully charged. The end of the exposure cycle, as that term is employed herein, occurs when the main storage capacitor is fully charged and is ready to supply electrical energy to the flashtube 52 for the next exposure. By initiating the charging of the electronic flash apparatus 47 at the same time that the film advancing apparatus 15 is transporting and processing an exposed film unit, the total time required to complete an exposure cycle is substantially reduced. Even in those instances where electronic flash charging must be interrupted during the operation of the film advancing apparatus 15 due to low battery voltage, the additional time required to fully charge the main storage capacitor 48, when added to the time required to operate the film advancing apparatus 15, will almost always be less than the time that would otherwise be required if the charging of the electronic flash apparatus 47 was delayed until the operation of the film advancing apparatus 15 was complete.

From the foregoing description of the invention, it will be apparent to those skilled in the art that various improvements and modifications can be made in it without departing from its true scope. The embodiments described herein are merely illustrative and should not be viewed as the only embodiments that might encompass the invention.

What is claimed is:

1. A self-developing camera having a reduced exposure cycle time, comprising:
    an electronic flash for providing artificial illumination during an exposure;
    a battery for supplying electrical power to said camera;
    means for sensing the magnitude of the voltage of said battery;
    means including an electrical drive motor for transporting and processing an exposed film unit; and
    control means responsive to said voltage sensing means for enabling said electronic flash to operate in a charging mode during the operation of said drive motor when the voltage sensed by said voltage sensing means is equal to or greater than some predetermined magnitude, and for precluding the operation of said electronic flash in said charging mode when said sensed voltage is less than said predetermined magnitude while simultaneously maintaining operation of said drive motor to thereby reduce the overall time required to complete an exposure cycle.

2. A self-developing camera as defined in claim 1 wherein said predetermined voltage magnitude is equal to the minimum voltage required by said drive motor to properly actuate said transport and processing means and thereby acceptably process an exposed film unit.

3. A self-developing camera as defined in claim 1 wherein said control means further includes means for varying the charge rate of said electronic flash in direct relation to the extent to which said sensed voltage exceeds said predetermined magnitude.

4. The self-developing camera as defined in claim 3 wherein said means for varying said electronic flash charging rate includes a voltage step-up transformer having a primary coil and a secondary coil with its secondary coil being electrically coupled to means for storing electrical energy transformed by said transformer that is subsequently employed to artificially illuminate a scene during an exposure interval, switch means for periodically coupling said battery to said transformer primary coil and means responsive to said sensed voltage for controlling the rate at which and the length of time during which said switch means couples said battery to said transformer primary coil.

5. The self-developing camera as defined in claim 4 wherein said switch means includes a transistor and said means for controlling the rate at which and the length of time during which said battery is coupled to said transformer primary coil includes means coupled to said transistor for generating a square wave signal for actuating said transistor between its battery coupling state and its battery uncoupling state in direct relation to the pulse width of said square wave signal whose pulse width varies in direct relation to the extent to which said sensed voltage exceeds said predetermined magnitude.

6. A self-developing camera as defined in claim 1 wherein said electronic flash forms an integral part of said photographic camera.

7. A method of reducing exposure cycle time in a photographic camera of the self-developing type having an electronic flash, a film unit for forming a photographic image, a transport and processing means for transporting an exposed film unit during film processing and a battery for supplying electrical power to the camera, comprising the steps of:
    sensing the magnitude of the voltage of the electrical power supplied to the camera by the battery; and
    enabling the electronic flash to operate in a charging mode while the transport and processing means is transporting an exposed film unit for film processing when the magnitude of said sensed voltage is equal to or greater than some predetermined magnitude and precluding the electronic flash from operating in the charging mode while simultaneously maintaining the operation of the transport and processing means when the sensed voltage is less than the predetermined magnitude to thereby reduce the overall time required to complete an exposure cycle.

8. The method of claim 7 wherein the transport and processing means includes a drive motor and the predetermined voltage magnitude above or below which said step of enabling or precluding the operation of the electronic flash in a charging mode is equal to the minimum voltage required by the drive motor to actuate the transport and processing means and thereby properly process an exposed film unit.

9. The method of claim 7 additionally including the step of varying the charge rate of the electronic flash in direct relation to the extent to which the sensed voltage exceeds the predetermined magnitude.

* * * * *